(12) United States Patent
Visel et al.

(10) Patent No.: US 6,448,325 B2
(45) Date of Patent: Sep. 10, 2002

(54) RUBBER COMPOSITION CONTAINING A SILICA COATED WITH A LIQUID LOW MOLECULAR WEIGHT EPOXIDIZED BUTADIENE POLYMER

(75) Inventors: Friedrich Visel, Bofferdange (LU); Thierry Florent Edme Materne, Viville (BE); Giorgio Agostini, Colmar-Berg (LU)

(73) Assignee: The Goodyear Tire & Rubber Company, Akron, NY (US)

( * ) Notice: Subject to any disclaimer, the term of this patent is extended or adjusted under 35 U.S.C. 154(b) by 0 days.

(21) Appl. No.: 09/794,447

(22) Filed: Feb. 27, 2001

Related U.S. Application Data

(60) Provisional application No. 60/188,505, filed on Mar. 10, 2000.

(51) Int. Cl.[7] .............................. C08J 5/10; C08K 3/34; C08L 9/00
(52) U.S. Cl. ...................... 524/492; 524/493; 524/494; 523/210; 152/905
(58) Field of Search ................................ 524/492, 493, 524/494; 152/905; 523/210, 211, 212, 213

(56) References Cited

U.S. PATENT DOCUMENTS

| | | | | |
|---|---|---|---|---|
| 3,622,650 A | * | 11/1971 | Berstein et al. ............ | 260/763 |
| 4,036,906 A | | 7/1977 | Finelli ........................ | 260/830 |
| 4,179,421 A | | 12/1979 | Edwards et al. ............ | 260/23.7 |
| 4,357,432 A | | 11/1982 | Edwards ...................... | 523/351 |
| 4,668,733 A | | 5/1987 | Anzinger et al. ............ | 524/572 |
| 4,829,115 A | | 5/1989 | Cottman ....................... | 524/255 |
| 4,992,513 A | | 2/1991 | Bauer et al. ................. | 525/184 |

FOREIGN PATENT DOCUMENTS

| | | | |
|---|---|---|---|
| EP | 0292232 | 11/1988 | ............ C08K/9/04 |
| EP | 0644235 | 3/1995 | ............ C08L/15/00 |
| JP | 292066 | 11/1998 | ............ C08L/9/00 |

OTHER PUBLICATIONS

Japanese Abstract XP–002168545.
"Organic Polymer–Surface Modified Precipitated Silica" by W. H. Waddell et al., as published in the *Journal of Applied Polymer Science*, 55, Mar. 21, 1995, No. 12. pp. 1627 through 1641.
European Search Report.

\* cited by examiner

*Primary Examiner*—James J. Seidleck
*Assistant Examiner*—U. K Rajguru
(74) *Attorney, Agent, or Firm*—Bruce J. Hendricks; John D. DeLong

(57) ABSTRACT

There is disclosed a rubber composition particularly suited for use in tires. The rubber composition is composed of 100 parts by weight of at least one rubber containing olefinic unsaturation; and from 1 to 150 parts per 100 parts by weight of rubber, of a silica having predispersed on the surface of the silica a liquid epoxidized butadiene polymer having a number average molecular weight of from 500 to 10,000.

15 Claims, No Drawings

RUBBER COMPOSITION CONTAINING A SILICA COATED WITH A LIQUID LOW MOLECULAR WEIGHT EPOXIDIZED BUTADIENE POLYMER

This application claims the benefit of U.S. Provisional Application 60/188,505 filed Mar. 10, 2000.

BACKGROUND OF THE INVENTION

A pneumatic tire is a polymeric composite and is a complex system of interacting components, each with specific properties for maximum effectiveness. One of the more important components of a tire is the tread. Since the tread of a tire comes into contact with the road, it is particularly compounded for abrasion and tear resistance. For example, abrasion resistance can correlate to tread wear and tear resistance can correlate to the tread's ability to resist chunking or tearing of the ground contacting tread elements. With the ever present need to improve the performance of tires, there is a continuous need for a rubber composition which improves both abrasion resistance and tear values. One current approach to this problem is the use of silica filler in the tread compounds. Unfortunately, the rubber environment and silica are very dissimilar and there needs to be improved methods to compatibilize this interface to yield better properties.

SUMMARY OF THE INVENTION

The present invention relates to a rubber composition particularly suited for the tread of a pneumatic tire. The rubber comprises 100 parts by weight of at least one rubber containing olefinic unsaturation; and from 1 to 150 phr of a silica having dispersed thereon a liquid epoxidized butadiene polymer having a number average molecular weight of from 500 to 10,000.

DETAILED DESCRIPTION OF THE INVENTION

There is disclosed a rubber composition comprising
(a) 100 parts by weight of at least one rubber containing olefinic unsaturation; and
(b) from 1 to 150 phr of a silica having predispersed on the surface of the silica, a liquid epoxidized butadiene polymer having a number average molecular weight of from 500 to 10,000.

In addition, there is disclosed a pneumatic tire having a rubber containing component made from a rubber composition comprising
(a) 100 parts by weight of at least one rubber containing olefinic unsaturation; and
(b) from 1 to 150 phr of a silica having predispersed on the surface of the silica, a liquid epoxidized butadiene polymer having a number average molecular weight of from 500 to 10,000.

The present invention may be used with rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The compositions of the present invention contain a silica that is coated or has predispersed on its surface a liquid low molecular weight epoxidized butadiene polymer. The amount of this silica may vary. Generally speaking, the level ranges from 1 to 150 phr. Preferably, the level of silica coated with the polymer ranges from 10 to 80 phr.

In the context of this invention, polybutadienes are understood above all to be the various structurally isomeric homopolymers of 1,3-butadiene. However, they are also understood to include copolymers to the type in which butadiene determines the chemical character of the compound. Butadiene homopolymers may exist as two isomers, namely, as 1,4-polybutadiene and as 1,2-polybutadiene. 1,4-polybutadienes are linear, unbranched and contain in the main chain double bonds in the "cis" or "trans" configuration, the 1,2-polybutadiene contain side groups having one vinylic double bond.

The epoxidation products of all the isomers mentioned above are suitable for the present invention.

In one embodiment of the invention, it is possible to use partially epoxidized cis-1,4-polybutadienes. Thus, 1,4-polybutadienes containing more than 70 percent of their double bonds in the cis configuration are suitable. Commercially available products of this type containing 80 percent or even 98 percent of their double bonds in the cis configuration are particularly suitable.

In another embodiment of the invention, it is possible to use 1,4-polybutadienes containing more than 20 percent, preferably more than 50 percent, most preferably 60 to 98 percent of their double bonds in the trans configuration.

Another embodiment of the invention is characterized by the use of 1,2-polybutadienes, i.e. materials containing vinylic double bonds. One particularly suitable starting material of this type contains from 20 to more than 80 percent, preferably 20 to more than 90 percent, most preferably from 20 to 98 lateral ethylenic bonds.

In the majority of cases, one may use an isomeric mixture of polybutadienes i.e. 1,4-polybutadienes containing from 20 to 70 percent of their double bonds in the cis configuration and/or from 20 to 50 percent of their double bonds in the trans configuration which, in addition, may contain from 0 to 3 percent, from 3 to 30 percent or even more side groups containing vinylic double bonds. Polybutadienes of different configuration may be produced by any of the methods generally known in polymer chemistry, see for example, the book by H. G. Elias entitled "Makromolekuele," 4$^{th}$ Edition, Huethig und Wepf-Verlag (pub.), Basel/Heidelberg/New York, Pages 676 (change in configuration from "cis" to "trans") and Pages 744 through 746 and 1012, et seq.

The liquid epoxidized butadiene polymer used in the invention include not only from epoxidized homopolymers of 1,3-butadiene, but also from epoxidized copolymers. Suitable copolymers are those of butadiene with styrene and/or acrylonitrile. Regardless the copolymer used, the butadiene content should predominate, i.e. not be less than 50 percent by weight. Stated in the alternative, the polymeric backbone of the liquid epoxidized butadiene polymer contains at least 50 percent by weight of polymeric units derived from butadiene.

The epoxidation process used to produce the epoxidized polybutadienes on which the polyolefins are based is not critical. Any standard epoxidation process may be used, including epoxidation with peracids, such as peracetic acid.

The epoxidized butadiene polymers containing from 1 to 8 percent by weight of epoxide oxygen, preferably 2 to 6 percent by weight, most preferably 3 to 5 percent by weight.

Accordingly, for every 10 double bonds originally present, up to 50 percent or even less may be subjected to epoxidation. The percentages quoted are based on polybutadienes. Where the above copolymers of butadiene are used, necessarily resulting in fewer double bonds in the polymer chain, a correspondingly higher conversion percentage, based on double bonds, is necessary in order to keep the total epoxide oxygen content between 1 and 8 percent. The low molecular weight epoxidized butadiene polymers are liquid at room temperature (22° C.). Accordingly, the epoxidized butadiene polymers have a number average molecular weight of 500 to 10,000, preferably 500 to 5,000, most preferably 1,000 to 2,000.

Commercially available liquid low molecular weight epoxidized butadiene polymers may be used in the present invention. One example is Polyol Huels 110 which has from 8.6–3.1 percent by weight of epoxide oxygen, 70 to 77 percent cis-1,4, 29–24 percent trans-1,4 and 1 percent 1,2 (vinyl) isomer distribution, and a molecular weight (wgt average) of 1500. Polyol Huels 110 is available from Huels.

The above liquid low molecular weight epoxidized butadiene polymers are dispersed on a siliceous pigment (alternatively referred to herein as silica filler). The silica filler that can be used include both pyrogenic and precipitated finely-divided silicas of the type heretofore employed for rubber compounding. The silica filler, however, is preferably of the type obtained by precipitation from a soluble silicate, such as sodium silicate. For example, silica fillers produced according to the method described in U.S. Pat. No. 2,940,830 can be used. These precipitated, hydrated silica pigments have a $SiO_2$ content of at least 50% and usually greater than 80% by weight on anhydrous basis. The silica filler may have an ultimate particle size in the range of from about 50 to 10,000 angstroms, preferably between 50 and 400 and, more preferably, between 100 and 300 angstroms. The silica may be expected to have an average ultimate particle size in a range of about 0.01 to 0.05 microns as determined by electron microscope, although the silica particles may even be smaller in size. The BET surface area of the filler as measured using nitrogen gas is preferably in the range of 40 to 600 square meters per gram, usually 50 to 300 square meters per gram. The BET method of measuring surface area is described in the Journal of the American Chemical Society, Vol. 60, page 304 (1930). The silica also has a dibutyl (DBP) absorption value in a range of about 200 to about 400, with a range of from about 220 to 300 being preferred.

The silica (before the polymer is applied) preferably has an apparent density of below 300 g/cm³ as measured by ASTM D-1573. Preferably, the silica has an apparent density ranging from 50 to 200 g/cm³.

Powdery forms or slurries of various commercially available silicas may be considered, for example, silicas commercially available from PPG Industries under the Hi-Sil trademark such as, for example, those with designations 210, 243, etc.; silicas available from Rhone-Poulenc, with designations of Z1165MP and Z165GR and silicas available from Degussa AG with designations VN2 and VN3, etc. The Rhone-Poulenc Z1165MP silica is a preferred silica which is reportedly characterized by having a BET surface area of about 160 to 170 and by a DBP value of about 250 to 290. Additional commercially available fumed or pyrogenic silicas may be used, for example Aerosel 200™ from Degussa and Cab-O-Sil™ from Cabot.

The liquid low molecular weight epoxidized butadiene polymer may be dispersed on the silica at a variety of levels. For example, the amount of polymer to silica may range in a weight ratio of from 0.2:1 to 1:1. Preferably, the ratio ranges from 0.3:1 to 0.7:1.

The liquid low molecular weight polymer may be dispersed onto the silica by a number of means. One mean would be to place the low molecular weight epoxidized butadiene polymer in an organic solvent and suspend the silica in solvent solution. Representative examples of suitable solvents include aliphatic $C_6$–$C_{12}$ hydrocarbons, aromatic or haloaromatic ($C_6$–$C_9$) hydrocarbons, or a $C_6$–$C_9$ aliphatic halohydrocarbon. Examples of suitable solvents include hexane, heptane, cyclohexane, benzene, toluene, xylene and chlorobenzene. The preferred solvents are hexane and heptane.

After the polymer cement and silica have been adequately mixed, the solvent is removed and treated silica is dried.

In compounding a silica filled rubber composition, one may use a coupling agent. Such coupling agents, for example, may be premixed, or pre-reacted, with the treated silica particles or added to the rubber mix during the rubber/treated silica processing, or mixing, stage. If the coupling agent and treated silica are added separately to the rubber mix during the rubber/treated silica mixing, or processing stage, it is considered that the coupling agent then combines in situ with the silica.

In particular, such coupling agents are generally composed of a silane which has a constituent component, or moiety, (the silane portion) capable of reacting with the epoxy groups on the treated silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the treated silica and the rubber and thereby enhances the rubber reinforcement aspect of the silica.

The rubber-reactive group component of the coupler may be, for example, one or more of groups such as mercapto, amino, vinyl, epoxy, and sulfur groups, preferably a sulfur or mercapto moiety and more preferably sulfur.

Representative examples of suitable coupling agents are sulfur containing organosilicon compounds. Specific examples of suitable sulfur containing organosilicon compounds are of the formula:

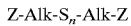

in which Z is selected from the group consisting of

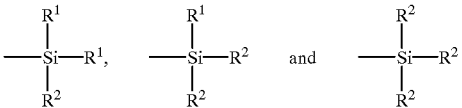

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclohexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis (triethoxysilylpropyl) disulfide and 3,3'-bis (triethoxysilylpropyl) tetrasulfide. Therefore, as to Formula I, preferably Z is

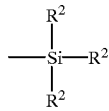

where $R^2$ is an alkoxy of 2 to 4 carbon atoms, with 2 carbon atoms being particularly preferred; Alk is a divalent hydrocarbon of 2 to 4 carbon atoms, with 3 carbon atoms being particularly preferred; and n being an integer of from 2 to 4 being particularly preferred.

The amount of the sulfur containing organosilicon compound of Formula I in a rubber composition may vary. Generally speaking, the amount of the organosilicon compound of formula I will range from 0.5 to 15 phr. Preferably, the amount will range from 1 to 10 phr.

The sulfur cured rubber composition may also contain conventional additives including reinforcing agents, fillers, peptizing agents, pigments, stearic acid, accelerators, sulfur vulcanizing agents, antiozonants, antioxidants, processing oils, activators, initiators, plasticizers, waxes, prevulcanization inhibitors, extender oils and the like. Representative of reinforcing agents or fillers include untreated silica as described above (prior to treatment with the polymer). Such silica may be used in an amount ranging from 1 to 150 phr. Additional fillers include carbon black, which is typically added in amounts ranging from about 5 to 100 parts by weight based on 100 parts by weight of total rubber (phr). Preferably, carbon black is used in amounts ranging from about 15 to 85 phr. Typical carbon blacks that are used include N110, N121, N220, N231, N234, N242, N293, N299, N326, N330, M332, N339, N343, N347, N351, N358, N375, N472, N539, N550, N660, N683, N754, and N765. Depending on the particular use of the compound, the appropriate carbon black may be selected. Representative of conventional accelerators are amines, guanidines, thioureas, thiols, thiurams, sulfenamides, dithiocarbamates and xanthates which are typically added in amounts of from about 0.2 to about 5 phr. Representative of sulfur vulcanizing agents include element sulfur (free sulfur) or sulfur donating vulcanizing agents, for example, an amine disulfide, polymeric polysulfide or sulfur olefin adducts. The amount of sulfur vulcanizing agent will vary depending on the type of rubber and particular type of sulfur vulcanizing agent but generally range from about 0.1 phr to about 5 phr with a range of from about 0.5 phr to about 2 phr being preferred. Representative of the antidegradants which may be in the rubber composition include monophenols, bisphenols, thiobisphenols, polyphenols, hydroquinone derivatives, phosphites, phosphate blends, thioesters, naphthylamines, diphenol amines as well as other diaryl amine derivatives, para-phenylene diamines, quinolines and blended amines. Antidegradants are generally used in an amount ranging from about 0.1 phr to about 10 phr with a range of from about 2 to 6 phr being preferred. Representative of a peptizing agent that may be used is pentachlorophenol which may be used in an amount ranging from about 0.1 phr to 0.4 phr with a range of from about 0.2 to 0.3 phr being preferred. Representative of processing oils which may be used in the rubber composition of the present invention include aliphatic-naphthenic aromatic resins, polyethylene glycol, petroleum oils, ester plasticizers, vulcanized vegetable oils, pine tar, phenolic resins, petroleum resins, polymeric esters and rosins. These processing oils may be used in a conventional amount ranging from about 0 to about 50 phr with a range of from about 5 to 35 phr being preferred. Representative of an initiator that may be used is stearic acid. Initiators are generally used in a conventional amount ranging from about 1 to 4 phr with a range of from about 2 to 3 phr being preferred.

Accelerators may be used in a conventional amount. In cases where only a primary accelerator is used, the amounts range from about 0.5 to 2.5 phr. In cases where combinations of two or more accelerators are used, the primary accelerator is generally used in amounts ranging from 0.5 to 2.0 phr and a secondary accelerator is used in amounts ranging from about 0.1 to 0.5 phr. Combinations of accelerators have been known to produce a synergistic effect. Suitable types of conventional accelerators are amines, disulfides, guanidines, thioureas, thiazoles, thiurams, sulfenamides, dithiocarbamates and xanthates. Preferably, the primary accelerator is a sulfenamide. If a secondary accelerator is used, it is preferably a guanidine, dithiocarbamate or thiuram compound.

Pneumatic tires are conventionally comprised of a generally toroidal shaped carcass with an outer circumferential tread adapted to the ground contacting space beads and sidewalls extending radially from and connecting said tread to said beads. The tread may be built, shaped, molded and cured by various methods which will be readily apparent to those skilled in the art.

The rubber composition may be used in a variety of rubber containing tire components. Such components include the tread, sidewall, apex, chafer, innerliner and wirecoat. Preferably, the rubber composition is used to form a tread rubber which can then be applied in the building of a green tire in which the uncured, shaped tread is built unto the carcass following which the green tire is shaped and cured. Alternatively, the tread can be applied to a cured tire carcass from which the previously tread has been buffed or abraded away and the tread cured thereon as a retread.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber containing component made from a rubber composition comprising
   (a) 100 parts by weight of at least one containing olefinic unsaturation; and
   (b) from 1 to 150 phr of a silica having predispersed on the surface of the silica, an epoxidized butadiene polymer having a number average molecular weight of from 500 to 10,000.

2. The pneumatic tire of claim 1 wherein the apparent density of the silica prior to dispersement of the polymer, is less than 300 g/cm$^3$ as determined by ASTM D-1573.

3. The pneumatic tire of claim 2 wherein the apparent density of the silica ranges from 50 to 200 g/cm$^3$.

4. The pneumatic tire of claim 1 wherein the backbone of said epoxidized butadiene polymer contains at least 50 percent by weight of polymeric units derived from butadiene and has an epoxide oxygen content of from 1 percent to 8 percent by weight.

5. The pneumatic tire of claim 1 wherein from 1 to 150 phr of additional filler is present.

6. The pneumatic tire of claim 5 wherein said filler is selected from the group consisting of silica, carbon black and mixtures thereof.

7. The pneumatic tire of claim 1 wherein the silica having the predispersed polymer is selected from the group consisting of pyrogenic and precipitated silicas.

8. The pneumatic tire of claim 1 wherein the silica has an ultimate particle size in a range of from about 50 to 1,000 angstroms and a BET surface area in the range of from about 40 to 600.

9. The pneumatic tire of claim 1 wherein a bifunctional sulfur containing organosilane is present.

10. The pneumatic tire of claim 1 wherein the weight ratio of polymer to silica ranges from 0.2:1 to 1:1.

11. The pneumatic tire of claim 1, wherein the number average molecular weight ranges from 500 to 5,000.

12. The pneumatic tire of claim 1, wherein the number average molecular weight ranges from 1,000 to 2,000.

13. The pneumatic tire of claim 1, wherein said epoxidized butadiene polymer has an epoxide oxygen content of from 1 to 8 percent by weight.

14. The pneumatic tire of claim 1, wherein said epoxidized butadiene polymer has an epoxide oxygen content of from 2 to 6 percent by weight.

15. The pneumatic tire of claim 1, wherein said epoxidized butadiene polymer has an epoxide content of from 3 to 5 percent by weight.

* * * * *

UNITED STATES PATENT AND TRADEMARK OFFICE
CERTIFICATE OF CORRECTION

PATENT NO.    : 6,448,325 B2
DATED         : September 10, 2002
INVENTOR(S)   : Friedrich Visel et al.

It is certified that error appears in the above-identified patent and that said Letters Patent is hereby corrected as shown below:

Column 5,
Line 6, add -- $cm^3/100g$ -- after "about 400" and after "220 to 300"

Column 8,
Line 47, delete add -- rubber -- between "one" and "containing"

Column 9,
Line 7, add -- $m^2/g$ -- after "40 to 600"

Signed and Sealed this

Seventh Day of January, 2003

JAMES E. ROGAN
*Director of the United States Patent and Trademark Office*